No. 648,497. Patented May 1, 1900.
O. KLATTE.
BLANK FOR MANUFACTURING WELDLESS LINK CHAINS.
(Application filed Feb. 18, 1899.)
(No Model.) 3 Sheets—Sheet 1.
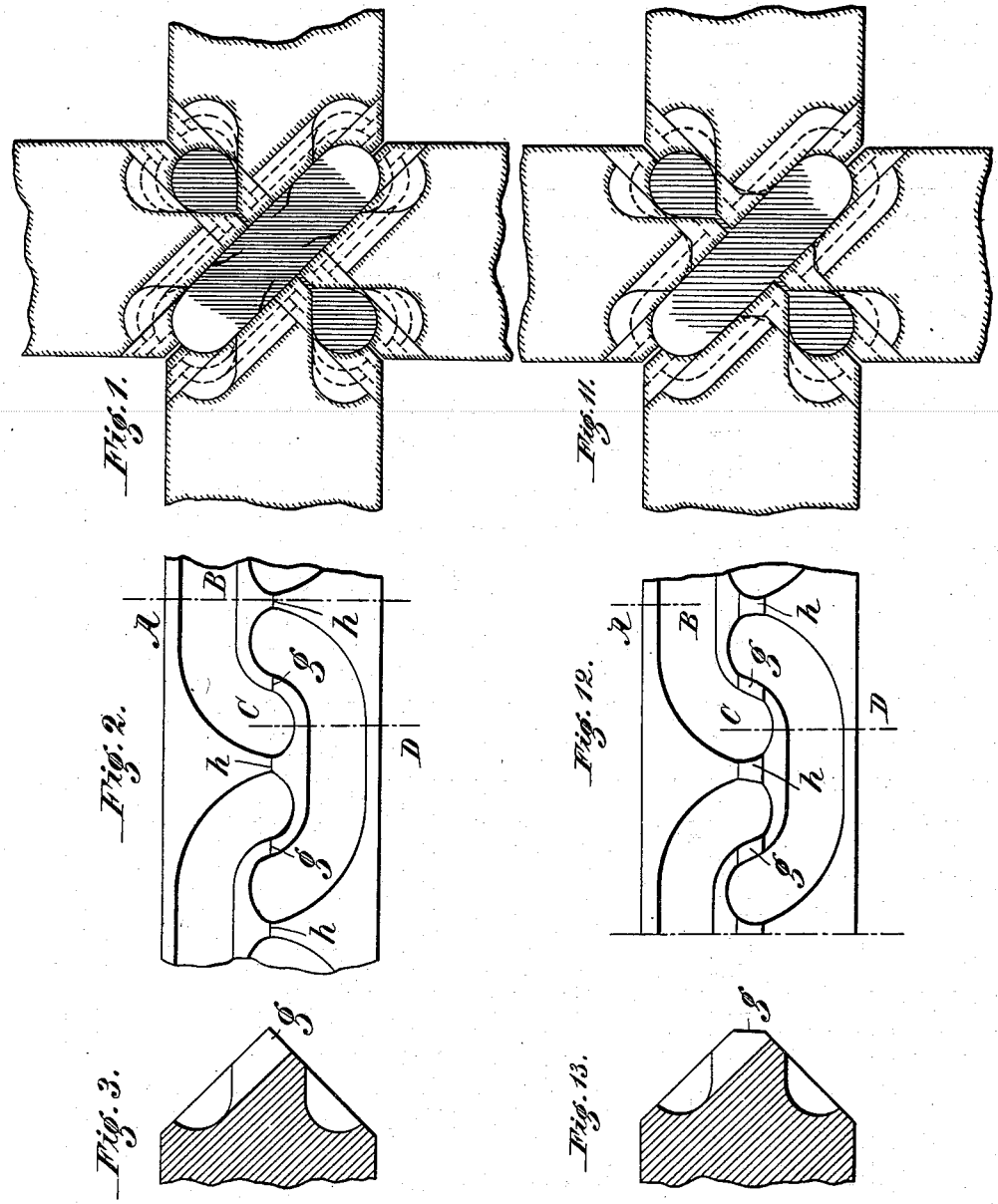

No. 648,497. Patented May 1, 1900.
O. KLATTE.
BLANK FOR MANUFACTURING WELDLESS LINK CHAINS.
(Application filed Feb. 18, 1899.)
(No Model.) 3 Sheets—Sheet 2.
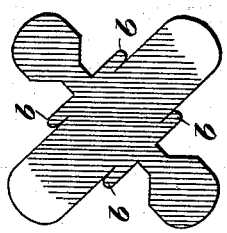
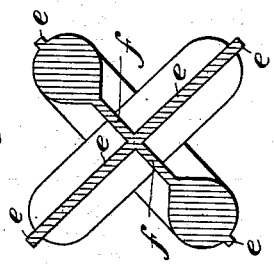
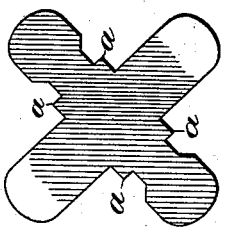
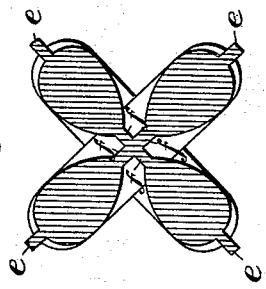
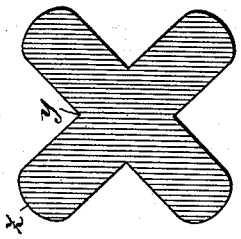
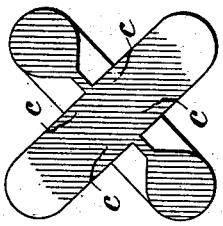
Witnesses:
C. Holloway
W. C. Pinckney
Inventor:
Otto Klatte,
By J. E. M. Bowen
THE NORRIS PETERS CO., PHOTO-LITHO., WASHINGTON, D. C.

No. 648,497. Patented May 1, 1900.
O. KLATTE.
BLANK FOR MANUFACTURING WELDLESS LINK CHAINS.
(Application filed Feb. 18, 1899.)
(No Model.) 3 Sheets—Sheet 3.
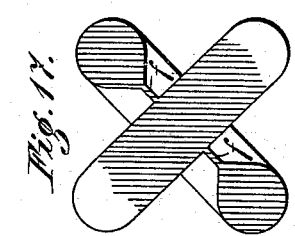
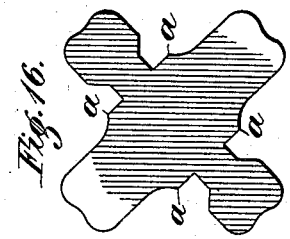
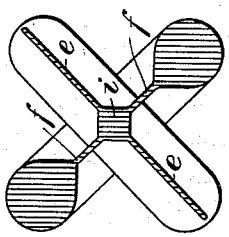
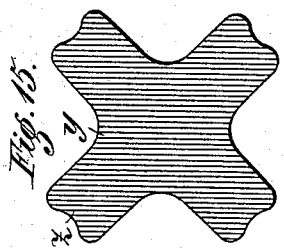
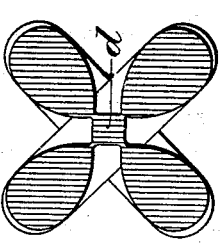
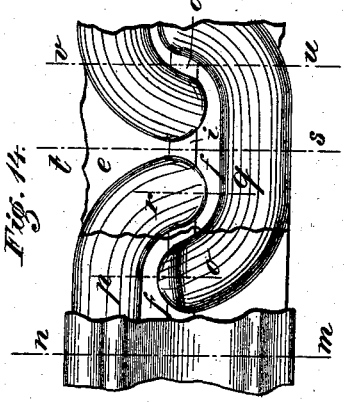
Witnesses:
C. Holloway
M. C. Pinckney
Inventor:
Otto Klatte,
By J. E. M. Bowen
Attorney
THE NORRIS PETERS CO., PHOTO-LITHO., WASHINGTON, D. C.

UNITED STATES PATENT OFFICE.

OTTO KLATTE, OF DUSSELDORF, GERMANY.

BLANK FOR MANUFACTURING WELDLESS-LINK CHAINS.

SPECIFICATION forming part of Letters Patent No. 648,497, dated May 1, 1900.

Application filed February 18, 1899. Serial No. 705,972. (No model.)

*To all whom it may concern:*

Be it known that I, OTTO KLATTE, a subject of the King of Prussia, Emperor of Germany, residing at Dusseldorf, Germany, have invented certain new and useful Blanks for the Manufacture of Weldless-Link Chains, of which the following is a specification.

This invention consists in a blank improved in such manner that weldless-link chains can be made therefrom without flaws therein, as common in this variety of chains.

Weldless-link chains are made from metal bars of cruciform cross-section by means of a four-roll rolling-mill or a four-die press, the rolls or dies of which are arranged in pairs opposite each other. The operative surfaces of the rolls or dies all meet at one point and are provided with orifices and depressions to receive the material of the metal bar.

Extensive experiments conducted by me have shown conclusively that in rolling or pressing a solid metal bar of cruciform cross-section the metal has never been properly displaced and redistributed. Owing to the manner in which the displacement of the metal has hitherto taken place, flaws running laterally from the inside to the outside of the ends of the links occurred, said flaws being present at those parts of the links which when the chain is stretched contact with each other. These flaws were sometimes visible from the outside of the link and appeared as seams when not previously welded out, and they considerably impaired the durability of rolled and pressed weldless chains, as has been proved by tests. These flaws were caused by the material pressed or displaced from two opposite flanges of the cruciform bar to form the interior opening of the link having been bulged up and then forced around with its colder exterior surface into and against the two opposite flanges and at points of the latter at which the ends of the links were already in process of formation, having been grooved by projecting parts of the rolls in the direction of rolling, the material thus displaced serving to fill out the depressions in the rolls or dies which form the link. The cause of the formation of these flaws is to be found partly in the shape of the cross-section of the bar hitherto employed and partly in the corresponding build of the working or operative surfaces of the rolls or dies. Hitherto bars of cruciform cross-section have been employed having the outer ends of their flanges rounded off and having sharply-defined angles between the flanges, and the operative surfaces of the rolls or dies were formed to a sharp gable-like ridge to correspond.

The object of the present invention is to avoid the formation of flaws of the kind described, thus increasing the durability of the chain and decreasing the wear and tear of the rolls.

The blank is of such form that when passed between suitable rollers the material displaced from one pair of flanges to form the inner opening of the link is forced in such a manner into the two other flanges as to cause the said displaced material which is not grooved by the points or projecting parts of the rolls to displace a corresponding mass of the material of the neighboring flange and to force the same toward the depression or mold of the rolls or dies designed to form the link from the latter flange, said metal being displaced in a curved line commencing at the end of the depression or mold and extending toward the center of the said link-mold similar to the current of water at the bend of a river. This manner of displacement causes, as it were, a meeting and upsetting of the masses in the link-forming depression or mold, which has the effect of completely filling the latter. The above statement is based on the presumption that the cross-section of the bar is not so great as that of the link-mold formed by the four operative surfaces of the rolls or dies. During this operation a part of the surplus metal displaced which is no longer longitudinally grooved or furrowed will be forced through the juncture of the links, which may be of a square or other shape, toward the outlet, and a part will be forced into the recesses for overflow metal arranged laterally between two link-molds. In order to attain this end, the bar metal having cruciform cross-section—*i. e.*, the improved blank—is rounded at the points of juncture of its flanges, or this angle is otherwise filled out in order to prevent the metal from being doubled over during the rolling process, and longitudinal grooves are formed in the outer ends of the said flanges in order to prevent too much material from being displaced and the consequent formation of a bur or web on the outer surface. The rolls have hitherto had a sharp ridge for rolling old forms of blanks; but with my improved blank I have the edge of the gable-like ridge flattened to correspond to the shape of the bar metal at the points of juncture of the flanges—i. e., the said ridges are either rounded off or made flat. In the case of dies the tops of the die-ridges are flattened or rounded off.

In the accompanying drawings, in which similar letters of reference denote similar parts throughout the several views, Figures 1 to 10 represent the old method, and Figs. 11 to 19 the present process. Fig. 1 is a vertical section through the rolls or dies at the point at which they meet to form the chain. Fig. 2 is a plan of the operative surface of one of the rolls. Fig. 3 is a section on line A B C D of Fig. 2. Fig. 4 is a side elevation showing the form of the bar metal during the rolling or stamping process. Figs. 5 to 10 are cross-sections taken, respectively, on the lines $m\,n$, $o\,p$, $q\,r$, $s\,t$, $u\,v$, and $w\,x$ of Fig. 4. Fig. 11 is a cross-section through the rolls or dies at their meeting-point, according to the present invention. Fig. 12 is a plan view of the operative surface of the rolls or dies. Fig. 13 is a section on the line A B C D of Fig. 12. Fig. 14 is an elevation of the bar after it has passed the rolls; and Figs. 15 to 19 are cross-sections respectively on the lines $m\,n$, $o\,p$, $q\,r$, $s\,t$, and $u\,v$ of Fig. 14.

It will be seen from Fig. 1 how the four rolls or dies grip the metal of the bar, forcing it into their recesses, and how the teeth or projecting parts of the said rolls or dies are forced into the flanks of the flanges, thus forcing the metal out of one flange toward the next. The initial and final stages of the impress of the teeth or projections of the rolls or dies into the metal are indicated in full lines, some of the intermediate stages being shown in dotted lines.

Fig. 5 shows a cross-section of the bar of cruciform section before the commencement of the rolling or pressing process. The sharp angle at the juncture of the flanges is indicated at $y$, the rounded-off ends of the said flanges being designated by $z$.

In Fig. 6 the teeth or projections of the rolls or dies have just been forced into opposite flanges, driving the material from the flanks of the flanges to the points indicated by $a\,a\,a\,a$. As the teeth or projections continue to press into the flanges still more material is forced toward and against the neighboring flanges, Fig. 7. Owing to the sharp angle at $y$, Fig. 5, and to the fact that the link-molds offer sufficient room and do not yet press on the material situated opposite, the metal displaced (which was previously furrowed or grooved in the direction of rolling by the sharp ridge of the rolls or dies) is doubled over, so as to form the laps $b\,b\,b\,b$. When the rolls or dies have advanced toward each other as far as is possible, the laps $b$ and the material forced after them will be pressed into the neighboring flange, Fig. 8, and, according to the temperature of the bar they will often, but not always, be noticeable as scars.

In Fig. 4 the formation of the laps is visible at $a$, $b$, and $c$. In this figure, $e$ indicates the outer and $f$ the inner web, which remain between the links. At that point where the teeth or projections $g$ of the rolls or dies become operative the inner webs $f$ meet in the form of a cross, Fig. 9, while at the operative points of the teeth or projections $h$ of the rolls or dies, Fig. 2, the outer webs $e$ and the inner webs $f$ meet and form a cross, as will be seen from Fig. 10.

In Figs. 1, 2, and 3 the ridges of the teeth or projecting parts of the rolls or dies are shown as being pointed or sharp, while in Figs. 12 and 13 the same are flattened.

In Fig. 11, as in Fig. 1, several stages of the impress of the projecting parts of the rolls into the sides of the flanges are indicated, the extreme stages being indicated by full lines and one intermediate stage by means of dotted lines.

Fig. 15 shows a cross-section through the cruciform bar or blank before the rolling or pressing process has commenced. The angle between the neighboring flanges of my blank is curved or gradual, as at $y$, while the outer edge of each flange is provided with a longitudinal groove, as at $z$.

In Fig. 16 the projecting parts of the rolls or dies have been forced into two opposite flanges and have displaced the material of the said flanges to the points $a\,a\,a\,a$. Owing to the gradual or curved part lying between each two flanges, the displaced material just mentioned sets the material of the next lying flange in motion, thus driving the material of the latter flange in the direction of the ends of the links being formed in these flanges and simultaneously making room for the following material, which is not furrowed or grooved in the present case. The longitudinal groove in the ends of the flanges is so dimensioned that the part of the same which enters the depressions or link-molds in the rolls or dies will be compensated by the above-mentioned surplus metal forced into the said molds, and thus the formation of bur on the exterior of the links will be prevented in that the molds are properly filled, but not overfilled. In the reduction or use of my blank there is no doubling over of the metal, the latter being so evenly distributed that after the projections of the rolls or dies have been forced into the bar as far as possible the same will show the cross-section represented at Fig. 17, the sections on lines $s\,t$ and $u\,v$ being as shown at Figs. 18 and 19. From the latter figures, as also from Fig. 14, it will be seen that between the links, besides the webs $e$ and $f$, the square plugs $d$ and $i$ remain, which results from the curved or gradual meeting of the neighboring flanges. Instead of being curved the line connecting the two flanges might be straight, thus forming two obtuse angles at the juncture of each two flanges instead of one acute angle. These connecting-plugs enable a displacement of material in the longitudinal direction from one link to the next without, however, grooving or creasing, as it were, the metal in this direction, as was the case with the old sharp ridges of the projections of the rolls or dies.

In Figs. 9 and 10 the formation of the crossing-points of the webs which had become too cold would not allow of the displacement of the metal in the above-described manner, and the same consequently forced itself laterally out of the link-molds forming the bur, as at $e$. The chain-bar thus formed is converted into a finished chain by stamping off the webs, shearing off the connecting-plugs, and removing the remaining metal from the points of incision of the shears.

I claim as my invention—

1. A blank for the manufacture of weldless-link chains with or without stays by rolling or pressing, consisting of a cruciform bar having curved, gradual or straight parts $y$ between the flanges, as and for the purpose described.

2. A blank for the manufacture of weldless-link chains with or without stays by rolling or pressing, consisting of a cruciform bar having curved, gradual or straight parts $y$ between the flanges and the edges of the flanges having grooves $z$, as described.

Signed at Dusseldorf, Germany, this 30th day of January, 1899.

OTTO KLATTE.

Witnesses:
　WM. ESSENWEIN,
　GEO. P. PETTIT.